(12) United States Patent
Maresca

(10) Patent No.: US 6,181,693 B1
(45) Date of Patent: Jan. 30, 2001

(54) HIGH SPEED VIDEO TRANSMISSION OVER TELEPHONE LINES

(75) Inventor: Michael Maresca, Mahwah, NJ (US)

(73) Assignee: High Speed Video, L.L.C., East Norwalk, CT (US)

( * ) Notice: Under 35 U.S.C. 154(b), the term of this patent shall be extended for 0 days.

(21) Appl. No.: 09/169,185

(22) Filed: Oct. 8, 1998

(51) Int. Cl.[7] .......................... H04L 12/56; H04M 11/00; H04N 7/08

(52) U.S. Cl. .............. 370/352; 370/389; 348/7; 348/423; 379/93.08; 379/93.15

(58) Field of Search .................. 370/259, 276, 370/280, 294, 352, 353, 354, 389, 465, 470, 471, 474, 522, 524; 348/6, 7, 10, 14, 16, 17, 403, 404, 405, 407, 423, 462, 467, 469; 379/93.01, 93.08, 93.14, 93.15; 709/230, 231, 246, 247

(56) References Cited

U.S. PATENT DOCUMENTS

| | | |
|---|---|---|
| 3,335,226 | 8/1967 | Michael et al. |
| 3,617,637 | 11/1971 | Gorman ............................ 179/2 TV |
| 3,649,761 | 3/1972 | Bush et al. ......................... 179/2 TV |
| 3,662,110 | 5/1972 | Van Fossen et al. .............. 179/2 TV |
| 3,711,648 | 1/1973 | Whitney ............................. 179/2 TV |
| 4,533,943 | 8/1985 | Poirier ..................................... 358/85 |
| 4,603,416 | 7/1986 | Servel et al. ............................ 370/60 |
| 4,926,416 | 5/1990 | Weik ................................... 370/60.1 |
| 5,007,045 | 4/1991 | Tsuzuki ................................. 370/94.1 |
| 5,140,417 | 8/1992 | Tanaka et al. ........................ 358/133 |
| 5,184,345 | 2/1993 | Sahni ..................................... 370/54 |
| 5,247,347 | * 9/1993 | Litteral et al. .......................... 358/85 |
| 5,303,236 | 4/1994 | Kunimoto et al. .................. 370/60.1 |
| 5,371,534 | 12/1994 | Dagdeviren et al. .................. 348/14 |
| 5,400,324 | 3/1995 | Eriksson et al. ........................ 370/60 |
| 5,446,491 | 8/1995 | Shibata et al. .......................... 348/15 |
| 5,533,108 | 7/1996 | Harris et al. .......................... 379/201 |
| 5,594,491 | * 1/1997 | Hodge et al. ............................ 348/7 |
| 5,654,957 | 8/1997 | Koyama ............................... 370/355 |
| 5,689,501 | 11/1997 | Takase et al. ........................ 370/244 |
| 5,732,078 | 3/1998 | Arango ................................ 370/355 |
| 5,732,085 | 3/1998 | Kim et al. ............................ 370/398 |
| 5,751,339 | 5/1998 | Aramaki et al. ....................... 348/17 |
| 5,756,280 | * 5/1998 | Soora et al. .......................... 455/4.2 |
| 5,768,350 | * 6/1998 | Venkatakrishnan ............... 379/93.08 |
| 5,768,527 | * 6/1998 | Zhu et al. ........................ 395/200.61 |
| 5,796,441 | * 8/1998 | Oshita ................................. 348/476 |
| 5,812,786 | * 9/1998 | Seazholtz et al. .............. 395/200.63 |
| 5,875,303 | * 2/1999 | Huizer et al. .................... 395/200.61 |
| 5,970,066 | * 10/1999 | Lowry et al. ........................ 370/353 |

* cited by examiner

Primary Examiner—Alpus H. Hsu
(74) Attorney, Agent, or Firm—Abelman, Frayne & Schwab

(57) ABSTRACT

A system for sending and receiving full motion, live, full duplex video of broadcast quality over existing telephone lines comprises apparatus for converting audio/video data recorded at a first location into a stream of packets, apparatus for reconverting the stream of packets into audio/video data to be presented at a second location, and apparatus for bypassing telephone company voice switches at central offices, thereby allowing the packets to travel directly from the local telephone lines to the long distance telephone network. The packets are created at the first location and are received at the second location and, in addition to encoded audio/video data, each packet contains a start flag, an end flag, and at least data specifying the encoding algorithm by which the encoded audio/video data was encoded.

16 Claims, 9 Drawing Sheets

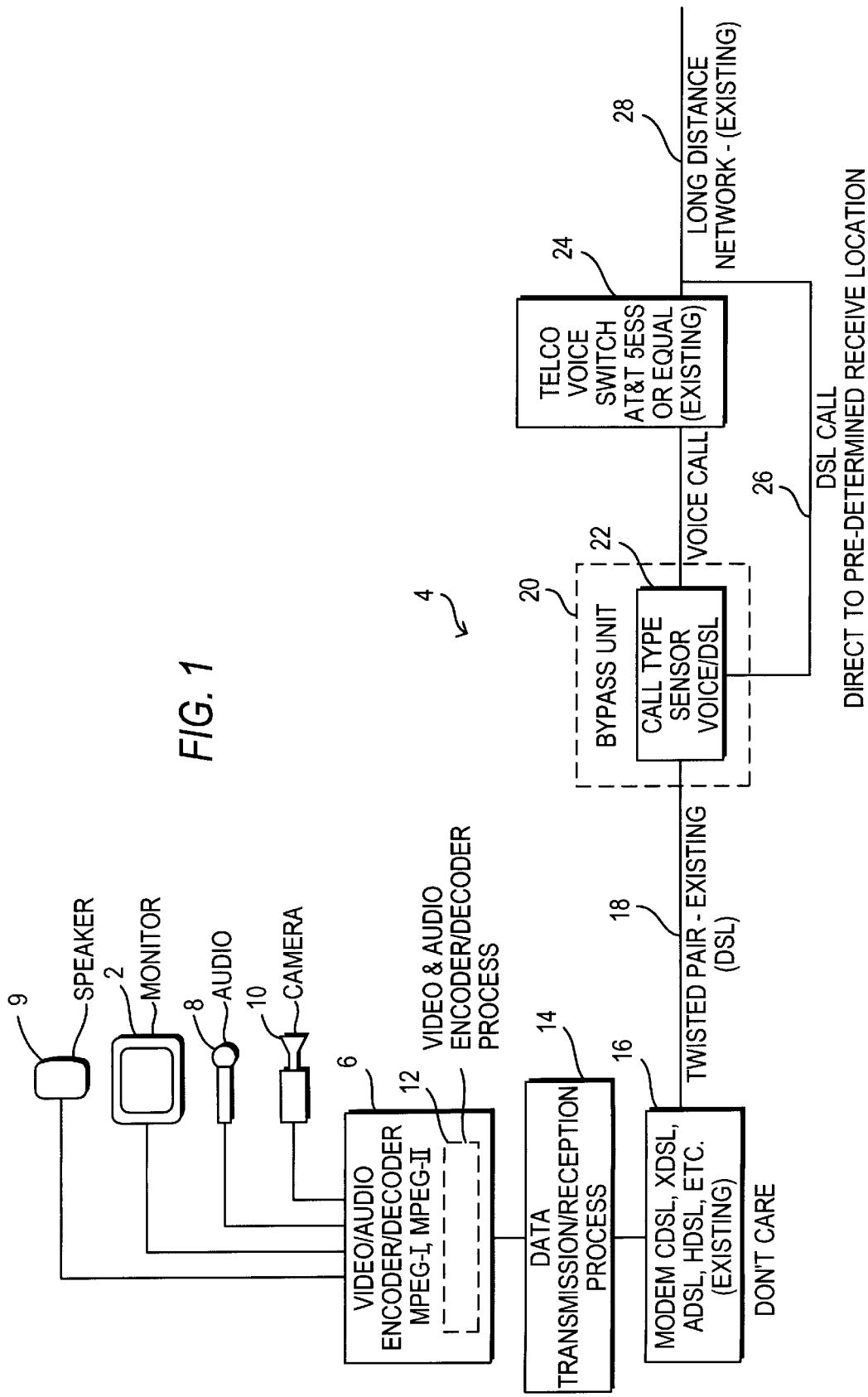

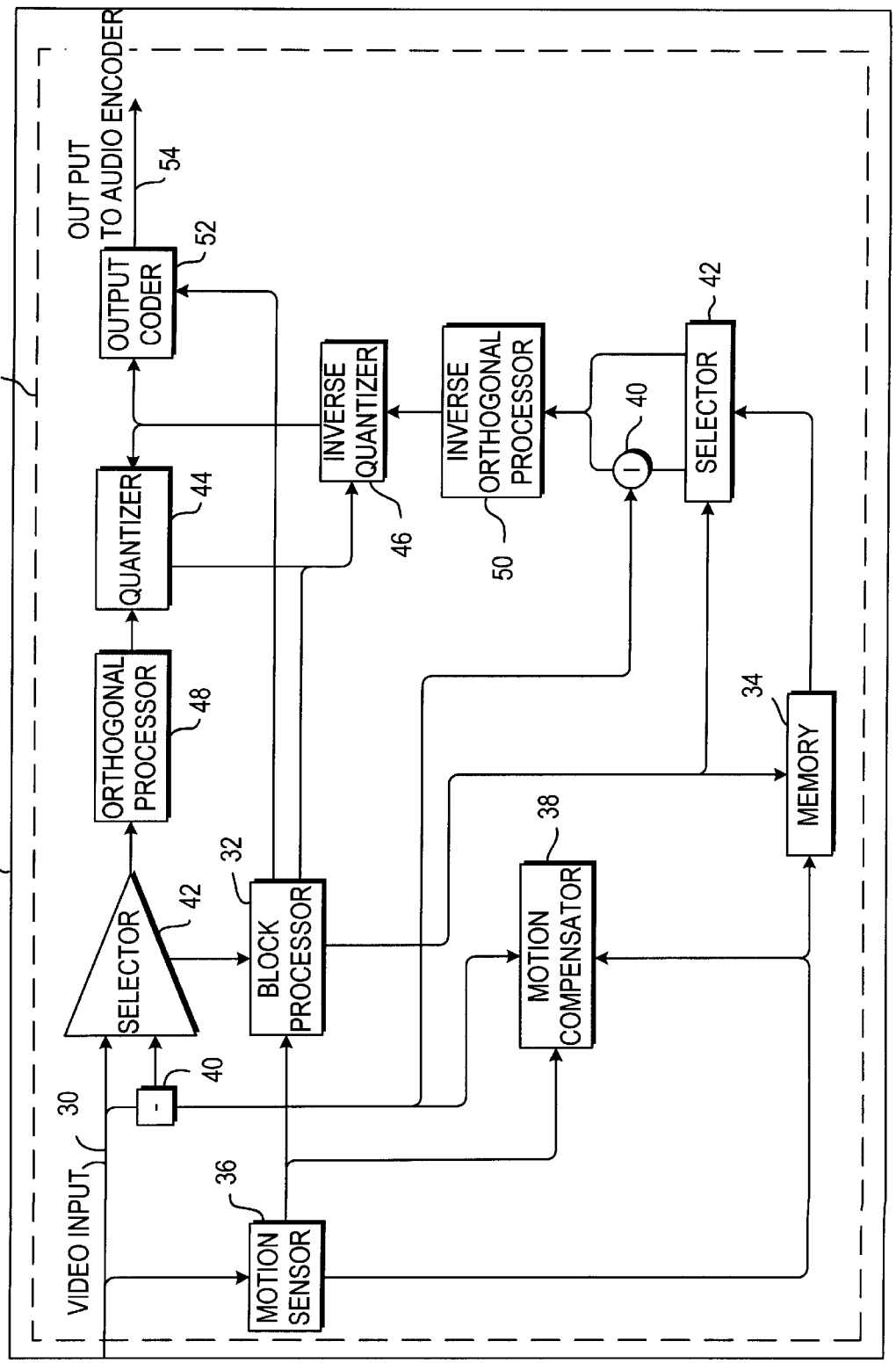

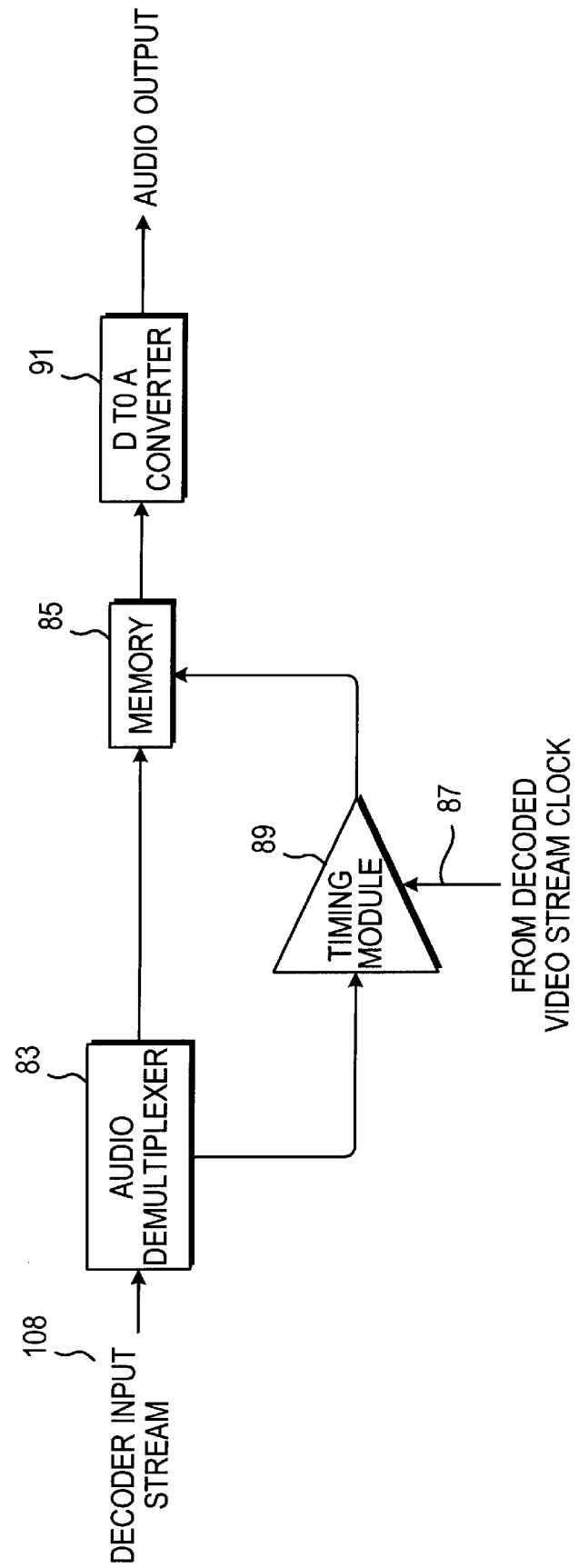

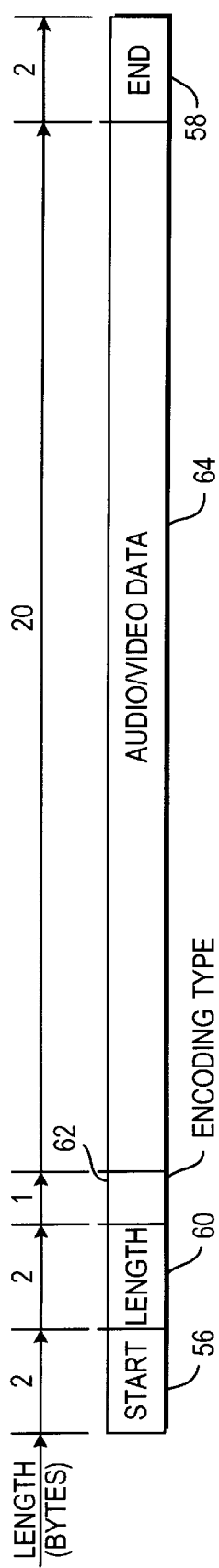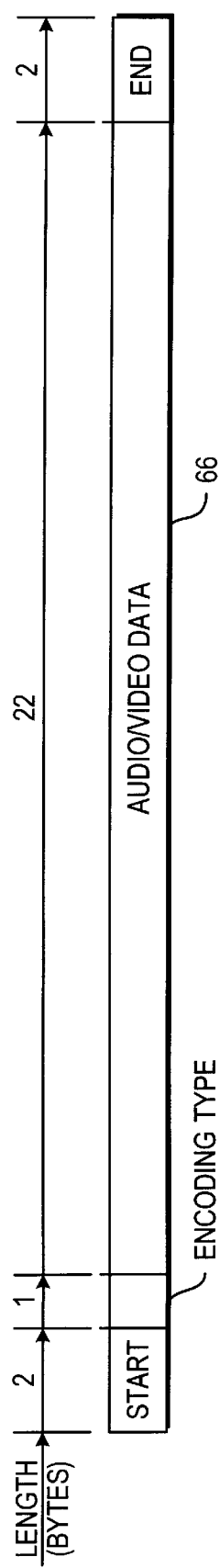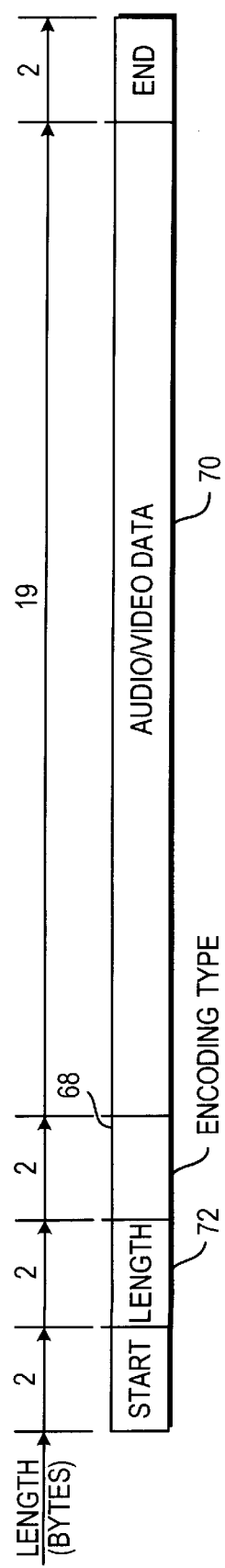

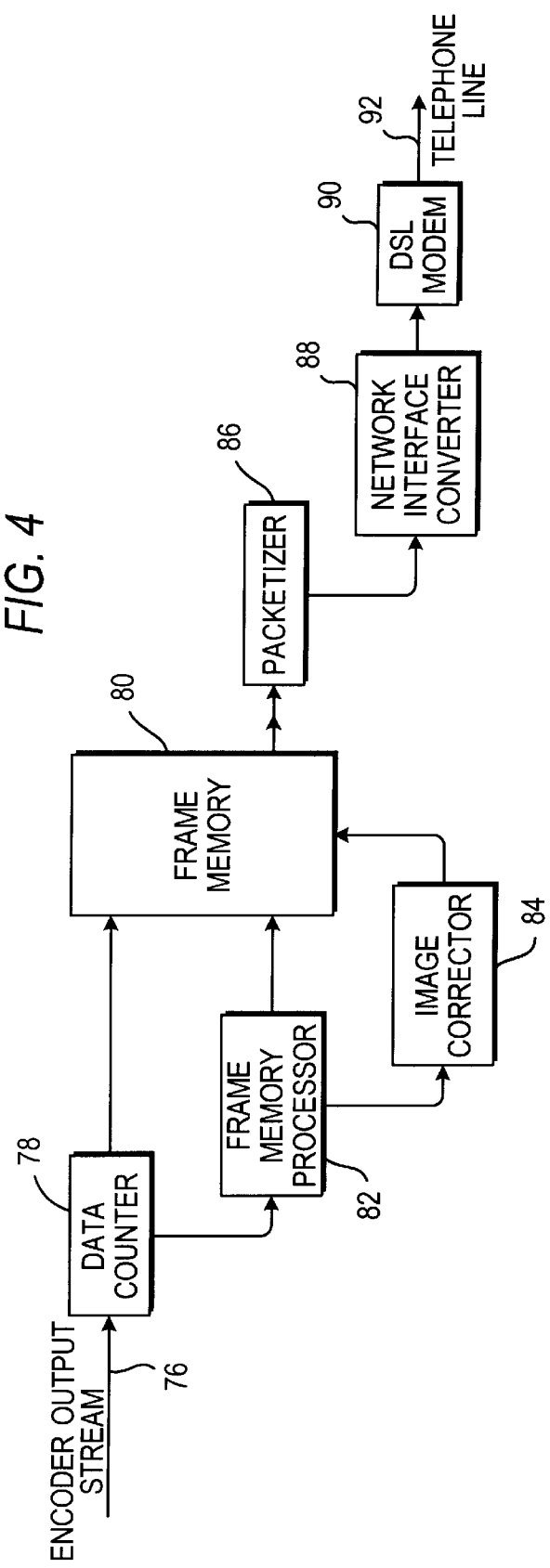
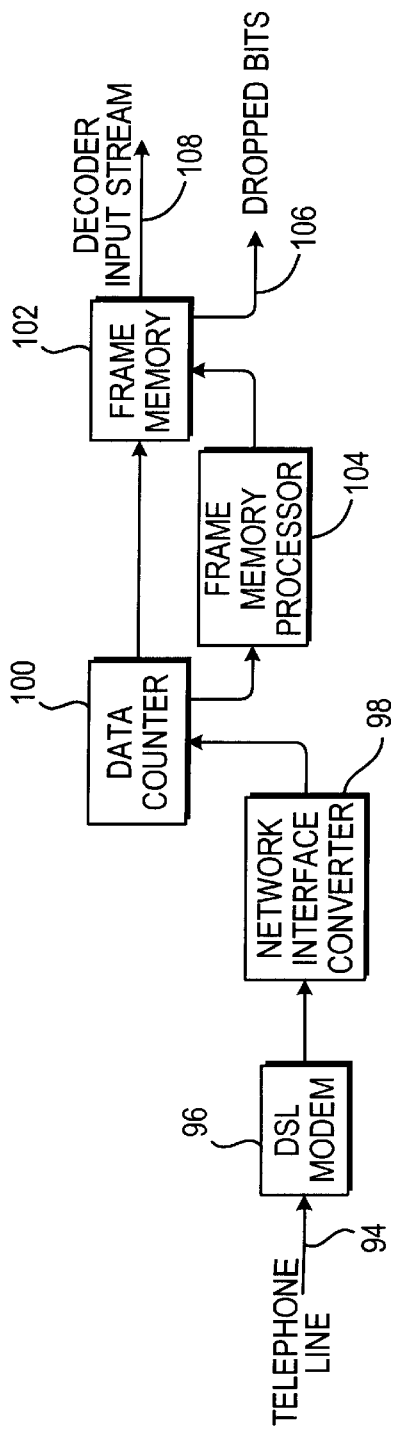
FIG. 4
FIG. 4A

HIGH SPEED VIDEO TRANSMISSION OVER TELEPHONE LINES

BACKGROUND OF THE INVENTION

1. Field of the Invention

This invention relates to the transmission of data over communication links and, in particular, to the transmission of full duplex, full motion, live video over existing telephone lines.

2. Description of the Related Art

The use of the telephone system to transmit video as well as voice communications is well known, and has been practiced for several decades. However, existing systems typically are either very expensive, or only allow transmission of images, particularly those which include movement, with noticeable delays, poor transmission quality, or some combination of these problems. In a basic sense, full motion video and in particular full motion interactive video, requires the delivery of a very significant amount of data in a relatively uninterrupted stream. The ability to accomplish this over standard twisted pair copper wire has heretofore not been achieved.

One of the more recent developments in seeking to provide improved video transmission has been the use of dedicated Integrated Services Digital Network (ISDN) lines for the data transmission. Although this has resulted in much improved transmission quality, the expense of ISDN lines still remains a formidable obstacle to their wide use. The use of ISDN systems for video transmission has been disclosed in eg., Dagdeviren et al., U.S. Pat. No. 5,371,534, Aramaki et al., U.S. Pat. No. 5,751,339, and Sahni, U.S. Pat. No. 5,184,345.

An alternative to the transmission of video data over telephone lines is the use of the Internet or other computer networks. The Internet or other computer networks do not have the cost disadvantage of using ISDN lines. However, the Internet relies on grouping the data to be transmitted over it into small component packages of data called packets. These packets are, in general, of unequal length and contain information to indicate where they begin and end, as well as source and destination information. Packets from diverse sources travel over the Internet together and, thus, must be recognized at any intermediate switching point and at their final destination points for recombination with other properly associated packets if successful transmission is to occur. The packeting methodology by its very nature leads to potential delays in transmission and processing, and a degradation in the quality of the transmission. In addition, the ever growing number of users on the Internet has compounded the delay in transmission. Delays and degradation in quality, although generally not critical in voice communications, cannot be tolerated in applications requiring a high data transmission rate such as full-motion, live, full duplex video transmission, particularly if broadcast quality or near broadcast quality video is required. However, to achieve full motion quality audio visual transmission, and to do so in a relatively inexpensive manner, presents a number of significant challenges. Many of these challenges would be overcome if a suitable method, apparatus and system were developed which could take maximum advantage of the existing vast network of twisted pair copper wire which carries the majority of voice telephonic communication today.

The present invention presents a solution to the heretofore unsolved problem of delivering full-motion, live, full duplex transmission of broadcast or near broadcast quality video over existing telephone networks. The benefits from the wide implementation of this technology are almost too innumerable to recount. Among its benefits are the vast expansion of both commercial and recreational use of the video telephone and the creation of a new era of interactive television and telephonic video communications. The potential uses span almost all fields of endeavor, including, for example, the entertainment industry, the financial services industry, the field of corporate communications, hotel and travel services, governmental agency and public services applications, medical services, educational services, and an almost endless variety of consumer applications.

In the field of entertainment for example, television viewers could participate visually and interactively with not only the host of a program, but other viewers as well. Entirely new television broadcast programming formats will become possible. Television news programs could create video chat rooms and solicit immediate viewer reaction to news as it occurs. News organizations could link their vast network of affiliates together to cover news as it happens using their combined resources. Programs directly marketing products or services would be enhanced by the ability of viewers to interact by video as well as by voice with the marketer and other customers.

Inexpensive video conferencing, particularly given the secure nature of hard-wired land line telephonic communications, is more compatible with the needs of many industries, such as the financial services industry, which in the past has had justifiable concerns about transmitting information over the Internet. Moreover, the present practice of business and financial community conference call reporting to the investment community can be greatly enhanced by providing video as well as audio interactivity among participants. In the hotel and travel industry, the availability of video transmission and reception at hotels enhances the services available to a business traveler who is enabled to maintain constant interactive point-to-point contact with home, office, and other business associates.

In general, private industry will, if it chooses, have the ready availability to create relatively inexpensively its own closed circuit television network, without the attendant costs of ISDN and T1 lines. Interactive communication between government agencies also has obvious significant advantages, particularly in emergency situations, and the advantages in the medical field of ready accessible visual communication and interactivity for patient diagnosis, monitoring, and the proliferation of services and knowledge between care givers, patients and hospitals is also self-evident. As well, the advantages in the field of education are significant, ranging from video tutoring and "wide area" classrooms to budget reduction as information is offered from a central location with the students enabled to maintain a personal, visual interaction with the instructor.

However, the most obvious beneficiaries of the present invention are individuals who, with the availability of a means to capture video, can, through the use of the present invention, employ standard telephone lines to communicate with another person or a group of others, in broadcast or near broadcast quality video.

The foregoing examples are in no way intended to be exhaustive and many other benefits stemming from the present invention will be obvious to those of ordinary skill in the art.

SUMMARY OF THE INVENTION

The present invention comprises means for capturing video images and associated audio, packeting the same, transmitting them as a smooth continuous stream of video and audio data over existing telephone networks, decoupling the data laden packets, and reassembling the data as video images with associated audio at the desired recipient location. In its preferred form, the present invention also permits a combination of the images from diverse locations, so that there is not only interactivity between a single sender and receiver, but, as well, with multiple parties.

To accomplish the high speed transmission of the video and audio data between source(s) and destination(s) and between switching points, preferably at rates approximating 2 megabits per second (mbits/sec), the present invention is particularly adapted to interface with Digital Subscriber Line (DSL) technology, recently developed by the telecommunications industry for existing telephone networks.

In its simplest form, a user has at his or her location a means to capture video imagery and the associated audio and convert it to a digital signal, and a means to convert a received digital signal into a presentation of video imagery and the associated audio. These means are generally well-known in the art and would include devices such as a microphone, a camera, a video/audio encoder/decoder, a monitor, and a speaker. In accordance with the present invention, the transmitted or received video signal is transmitted to or received from local telephone lines in packets of predetermined, preferably equal length. Each packet is generally encoded with the following information: (1) information indicating the beginning and the end of the packet, (2) information indicating the length of the packet, (3) information indicating the algorithm used to encode the audio/video data, and (4) the encoded audio/video data itself.

Thus, even before the audio/video data leaves the location of the sender, it has been transformed into packets to be transmitted over ordinary communication lines (which in a majority of cases may be regular twisted paired copper lines) to the central switching office maintained by the telephone company, and the audio/video data remains in packet form until it arrives at the location of the receiver.

When transmitted packets are received at the central office, the data passes through a bypass unit, designed in accordance with the teachings of the present invention, which recognizes the nature of the signal being presented. If the signal is voice only, then the transmission enters the phone system to be processed in the customary manner of a voice transmission. If, however, it is a signal carrying the imprint of the present invention, as applied thereto at the point of origination, then the signal is segregated and the order of data receipt is continuously maintained so that it can be transmitted in a smooth, relatively unbroken stream of related packets. When that signal is received at the central office which services the recipient, it is identified by another bypass unit. The packet stream is routed by the bypass unit to the recipient who has the apparatus designed in accordance with the present invention to capture the data and convert the packets to an audio/video signal which is in turn displayed on a video device with accompanying audio projected.

Since the transmission and reception of the packets is based on a first in/first out protocol, as packets are pulled out to be transmitted or received, they are immediately replaced with the next packets required to be transmitted or received. As a consequence, the sequence is maintained in a relatively uninterrupted manner. Although it is indeed preferable to transmit and receive all data without any error, the system of the present invention need not transmit and receive 100% of the data since an acceptable, indeed very high quality video signal will be enabled even with a loss of some data from the stream of data.

The present invention thus provides means to allow the transmission and reception of full motion, full duplex, live video data and accompanying audio data over existing telephone lines with the concomitant benefit of permitting parties at remote locations to visually and audibly communicate with each other. As well, if one of the parties to the connection is a television studio originating a video broadcast, the video communications received will be and can be transmitted and received between any two points served by the conventional telephone network, at a cost which does not deter widespread use.

These and other objects and advantages of the present invention will become more apparent to those of ordinary skill in the art upon consideration of the attached drawings and the following description of the preferred embodiments which are meant by way of illustration and example only, but are not to be construed as in any way limiting the invention disclosed and claimed herein.

BRIEF DESCRIPTION OF THE DRAWINGS

FIG. 1 is a schematic diagram showing the transmission/reception end of a typical embodiment of the present invention together with its connection to the existing telephone network.

FIG. 2 is a flow chart of the video encoder process.

FIG. 2C is a flow chart of the audio decoder process.

FIG. 3 is a schematic diagram showing a first embodiment of the format of a fixed length packet carrying audio/video data.

FIG. 3A is a schematic diagram showing a second embodiment of the format of a fixed length packet carrying audio/video data.

FIG. 3B is a schematic diagram showing a third embodiment of the format of a fixed length packet carrying audio/video data.

FIG. 4 is a flow chart of the data transmission process.

FIG. 4A is a flow chart of the data reception process.

DESCRIPTION OF THE PREFERRED EMBODIMENT(S)

Figure 2A:
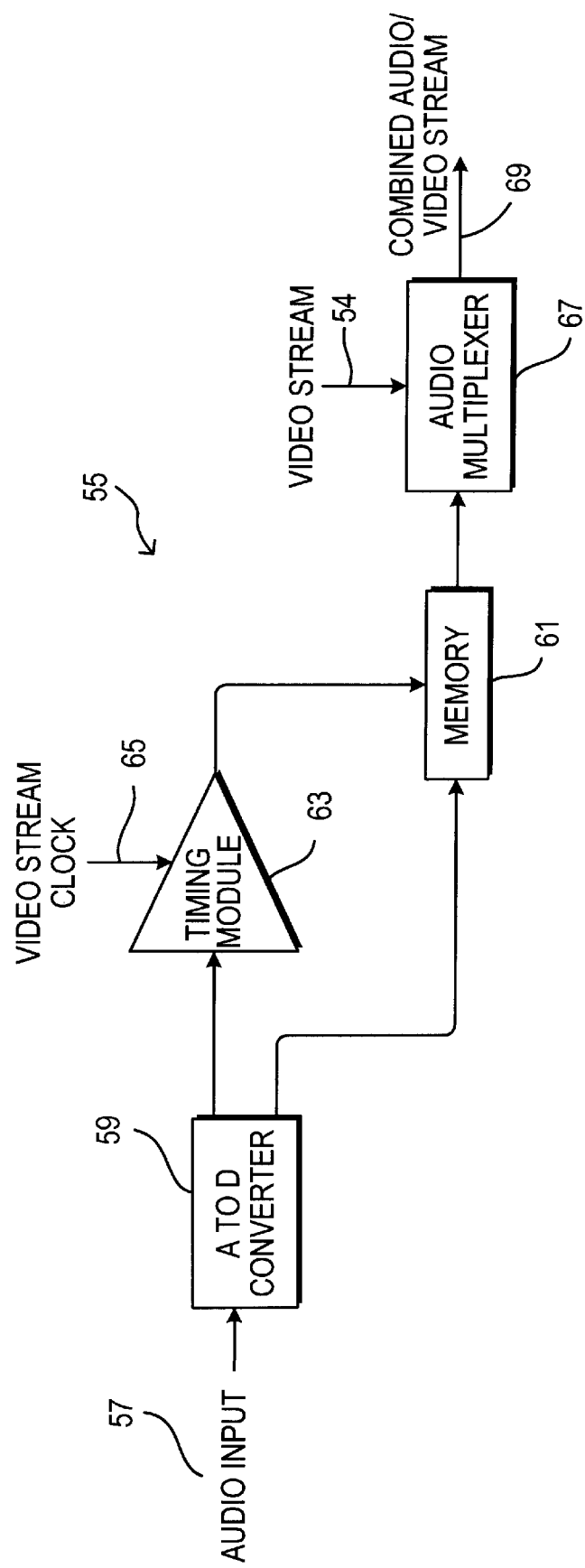
FIG. 2A is a flow chart of the audio encoder process.

FIG. 1 shows components of the invention included in the transmission/reception end of a connection transmitting and receiving audio/video packets in accordance with the invention. A monitor 2 capable of displaying a video picture of broadcast quality, which video picture has been transmitted from a remote location over the existing telephone network 4 by the packets created in accordance with the present invention, is connected to video/audio encoder/decoder 6 of a design known in the art capable of using or decoding a conventional data encoding protocol such as, for example, AVI, MPEG-I, or MPEG-II. A speaker 9 capable of projecting audio data is also connected to the video/audio encoder/decoder 6. A microphone or other device 8 capable of picking up audio data is also connected to the video/audio encoder/decoder 6. Finally, a camera 10 capable of receiving video data is also connected to the video/audio encoder/decoder 6. The video and audio data, which have been either encoded or decoded by the audio/video encoder/decoder 6, is either encoded or decoded by the video and audio encoder/decoder process 12.

The packets are either transmitted to a remote location by being sent in a stream or are received from a remote location in a stream and the stream is decomposed into its constituent encoded data by the data transmission/reception process 14. A modem 16, capable of interfacing between existing telephone lines and a location receiving and transmitting video and audio data, and compatible with some variation of the DSL protocol, such as, for example, CDSL (Consumer DSL) or ADSL (Asynchronous DSL), receives and transmits the inventive packets from and to existing local telephone lines 18.

A bypass unit 20, comprising sensor 22, and capable of distinguishing between an ordinary voice call and a DSL call carrying the inventive packets, is connected to the existing local telephone lines 18. The bypass unit 20 is installed at the telephone company central office. The bypass unit 20 allows an ordinary voice call to pass unimpeded to the existing telephone company voice switch 24 at the central office. However, a DSL call carrying the inventive packets is shunted 26 directly onto the existing long distance telephone network 28 by the bypass unit 20, thereby bypassing the existing telephone company voice switch 24.

FIG. 2 is an exemplary flow chart of the video encoder process 29. A typical video/audio encoder/decoder 6, employing the encoding process 29, accepts a video input 30, and feeds it through a block processor 32 which divides it into many blocks comprising an image. An image or frame so divided into blocks is stored in memory 34. When the next image or frame is obtained from the video input 30, a motion sensor 36 determines the amount of change or motion in the image. Based on the encoding algorithm, FIG. 2 being based on a conventional encoding algorithm, namely, H 0.320, the motion compensator 38 decides which block (if any) has changed and to what degree. If, based on the encoding algorithm, the change in a portion of the image is sufficient, a mix-minus or data subtractor 40 determines the exact difference and stores the new image into memory 34. The difference between the two frames stored in the memory 34 is selected by the selectors 42, and processed by a quantizer 44, an inverse quantizer 46, an orthogonal processor 48, and an inverse orthogonal processor 50. An output coder 52 assembles an output data stream 54 which includes information about the coding process (type, frame lengths, resolution, etc.) FIG. 2A shows the audio encoder process 55. Audio input 57 is sent to an analog to digital converter. The data is sent into a memory block for short term storage in a memory 61. A timing module 63, which takes a clock pulse 65 from the video encoder stream 54, determines where to insert the audio data in the output stream 54 (see FIG. 2) to sychronize the audio to the video. The audio data is inserted as bit(s) at particular locations in the video Stream 54 by the audio multiplexer 67 to form a combined audio/video stream 69.

Figure 2B:
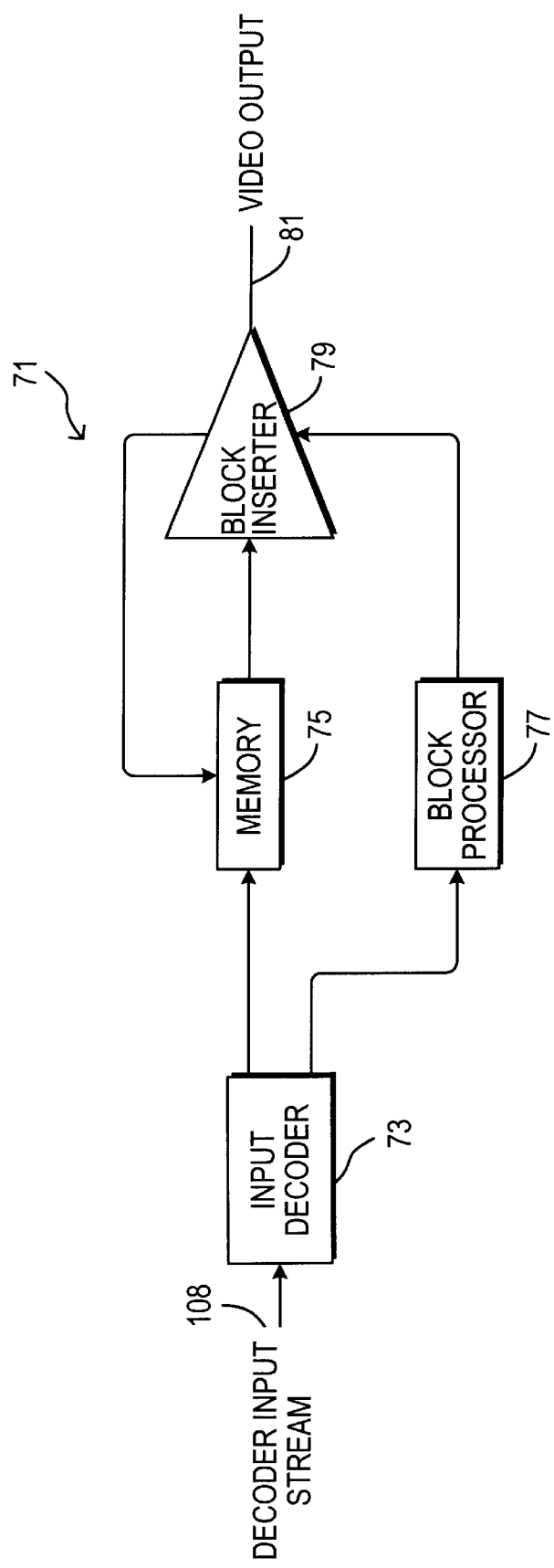
FIG. 2B is a flow chart of the video decoder process.

FIG. 2B shows the video decoder process 71. The input decoder 73 converts the decoder input stream 108 (see FIG. 4A) into blocks for short term storage in memory 75. A block processor 77 evaluates the "changed" blocks and through the use of a block inserter 79, replaces those blocks which have changed into the memory 75. This information is then sent out as a complete video frame 81.

FIG. 2C shows the audio decoder process. The decoder input stream 108 is sent through an audio demultiplexer 83 to intercept the bits which contain audio information. The audio data is sent into memory 85 as short term storage while a clock pulse 87 taken from the video stream 81 (see FIG. 2B) is used by a timing module 89 to determine when to output the audio so that it is in the proper time relation with the video. The audio data is sent through a digital to analog converter 91 to convert the data back into an analog audio signal.

FIGS. 3, 3A, 3B, and 3C show formats of various embodiments of packets of a fixed length of 27 bytes. By sending and receiving packets of a fixed length directly from and at the sending and receiving location, the existing telephone company equipment is not required to perform processing and/or frame buffering which would slow down transmission. This is extremely important for the smooth transmission of video. The packets do not contain address/destination information and site hardware information since they are being sent to a predetermined location directly by the telephone company equipment. Packets will be sent to the proper destination based on the telephone number dialed by the DSL modem 16 (see FIG. 1). Sending and receiving packets from and at end user locations allows high speed transmission and reception even over the first and last link from the end user transmitting location to a first telephone company central office, office and from a second telephone company central office to the end user receiving location, respectively.

FIG. 3 shows a first embodiment of the format of the packets. The packets start with a two byte start flag 56 and end with a two byte end flag 58. These flags indicate to the telephone company equipment where each packet begins and ends and conform to telephone company specifications which are a function of a particular telephone company network over which the packets are travelling. Following the start flag 56 are two bytes 60 which confirm the length of the packet. One byte 62 indicating the type of encoding algorithm used to create the audio/video data in the packet follows the length confirming bytes 60. The length confirming bytes 60 and the encoding type byte 62 are ignored by the telephone company equipment, being read by the hardware at the sending and receiving locations and by the bypass units only. Finally, twenty bytes of the actual encoded audio/video data 64 sought to be transmitted forms the remainder of the packet. The format of the audio/video data is determined by the type of encoding algorithm used to create the audio/video data.

FIG. 3A shows a second embodiment of the format of the packets. The second embodiment differs from the first embodiment in that it does not include the length confirming bytes 60 found in the first embodiment. If the hardware on both the sending and receiving ends is standardized to recognize that each packet is always 27 bytes long, any errors can be calculated using the start 56 and stop 58 flags alone. This would allow the audio/video data 66 to occupy an increased length of 22 bytes. The first embodiment would, however, be necessary in a situation where hardware is located at either the transmitting or receiving end which interacts with the packets and is not programmed to be aware of the packet length.

FIG. 3B shows a third embodiment of the format of the packets. The third embodiment differs from the first embodiment in that the one byte 62 indicating encoding type in the first embodiment has been lengthened to two bytes 68 in the third embodiment due to the possible release of additional encoding algorithms in the future. For example, there is a possibility that MPEG-III and MPEG-IV may be released shortly. A single byte enables the identification of up to two hundred fifty six (256) encoding algorithms, but the identification of more encoding algorithms may be needed. The increase of this byte to two bytes would allow for additional encoding algorithms to be signalled to the encoding/decoding devices. The use of two bytes 68 for the type of encoding algorithm would decrease the audio/video data 70 length by one byte when compared to the audio/video data 64 in the first embodiment, leaving the new length of the audio/video data 70 at 19 bytes.

Figure 3C:
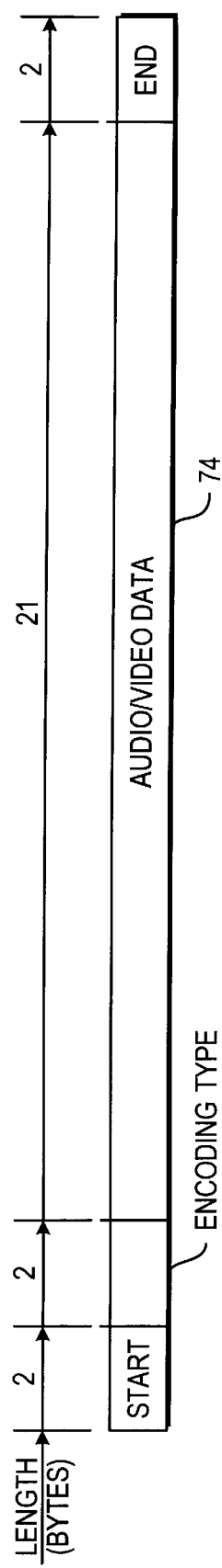
FIG. 3C is a schematic diagram showing a fourth embodiment of the format of a fixed length packet carrying audio/video data.

FIG. 3C is a fourth embodiment of the format of the packets. It differs from the third embodiment of the format of the packets in that the two bytes 72 indicating the length of the packet in the third embodiment have been eliminated in the fourth embodiment for the same reason that they were eliminated in the second embodiment. Eliminating the length information in the fourth embodiment allows the audio/video data 74 to increase by two bytes in length, leaving the length of such audio/video data 74 at 21 bytes.

FIG. 4 is a flow chart of the data transmission process which assembles the encoder output data stream into a stream of packets. The encoder output data stream 76 (labelled as 69 on FIG. 2A) is read by a data counter 78, and passes into frame memory 80, being stored on a first in first out (FIFO) basis. The data counter 78 sends flags to the frame memory processor 82 to notify frame memory 80 of missing or corrupt bits. The frame memory processor 82 sends the bit location information of the missing or corrupt bits to the image corrector 84 which determines an appropriate corrective action and sends corrected bits to the frame memory 80. The error correction process will be an averaging process such that if a corrupted or missing bit is detected, the image corrector 84 will take the value of the bit before and the value of the bit after the corrupted or missing bit and insert an average of the two in place of the corrupted or missing bit.

The signal is transmitted from the frame memory 80 on a FIFO basis to the packetizer 86 which produces packets in one of the formats represented in the embodiments shown in FIGS. 3, 3A, 3B, and 3C. The packets are then sent through a network interface converter 88 which buffers the signal to conform with the connection specifications of a DSL modem, such connection specifications being, for example, standard protocols such as 10Base-T, Thinnet, and TCP/IP. The DSL modem 90 then sends the pre-formatted packets to the central office by the local telephone line 92.

FIG. 4A is a flow chart of the data reception process which disassembles a stream of packets into a decoder input data stream. A stream of packets is received from the local telephone line 94 by a DSL modem 96 and sent through a network interface converter 98 which removes the buffering placed on the packets by the network interface converter 88 at the transmit end of the connection. The packets are then sent through a data counter 100 and into frame memory 102. The data counter 100 sends flags to the frame memory processor 104 which informs the frame memory 102 which bits 106 to discard as part of the start and stop flags, the length bytes, and the encoding type byte(s). The data, without the discarded bits, is sent as a decoder input stream 108 to a decoder which converts the data into a viewable image on a display monitor with accompanying sound projected from a speaker.

Figure 5:
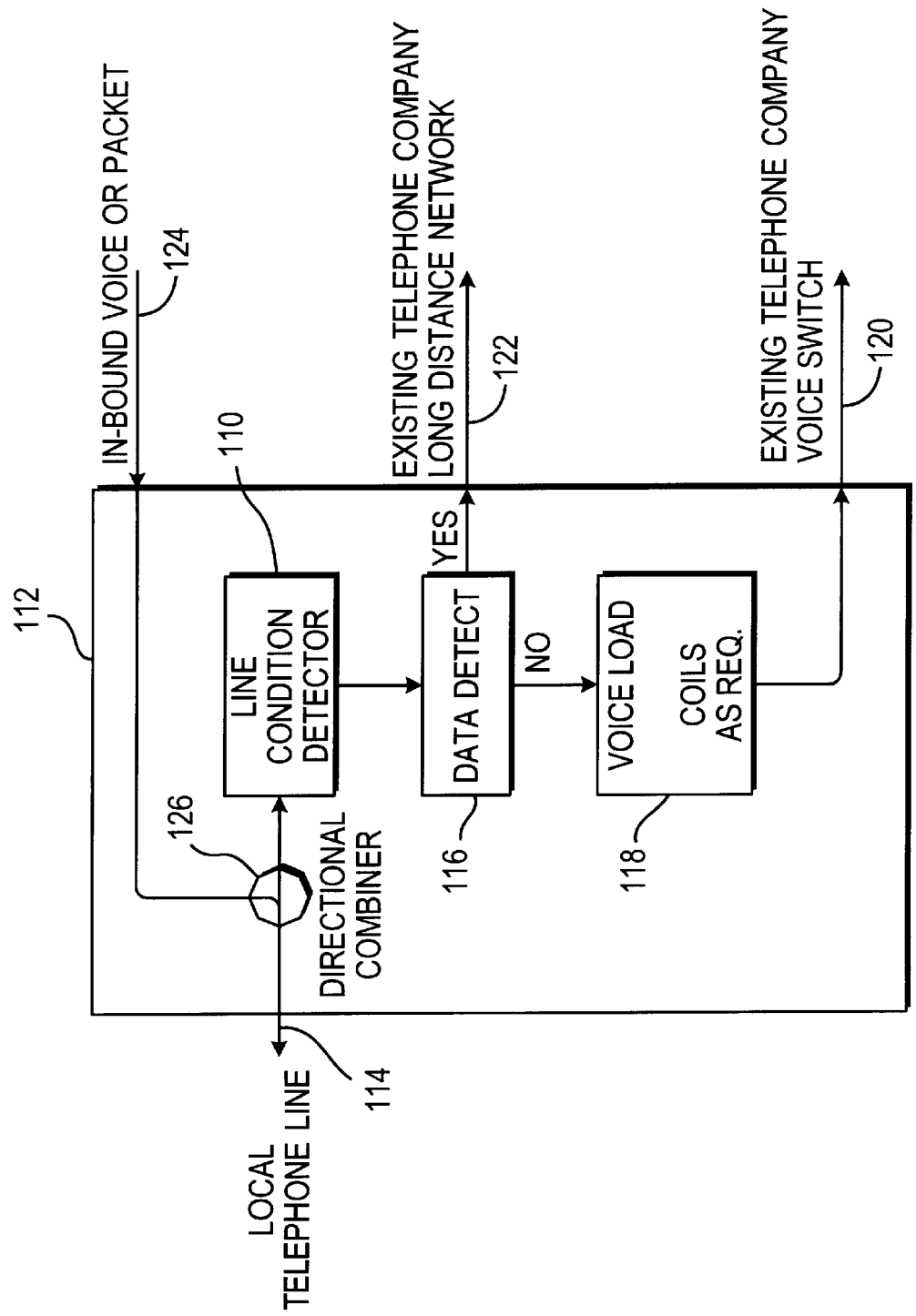
FIG. 5 is a schematic diagram showing the hardware components of the bypass unit.

FIG. 5 is a schematic diagram showing the hardware components of the bypass unit 112 installed at the telephone company's central office. When an off hook condition is generated by the telephone company's telephone or a splitter connected to a DSL modem, the condition is sensed by a line condition detector 110 within the bypass unit 112. The incoming signal over the local telephone line 114 is then sent to a data detection circuit 116 which "listens" to the telephone line 114 to determine if the inventive packets are present. If no packets are present, the data detection circuit 116 sends the signal to a standard telephone company voice loading coil 118 as required by voice switches and then that signal is transmitted 120 to the standard telephone company voice network switch. If packets are detected on the line, the data detection circuit 116 bypasses the standard telephone company voice network switch and sends 122 the packets directly out to the telephone company's long distance network. Inbound voice calls and packets 124 are received by the bypass unit 112 which, by means of a directional combiner 126, sends the signal to the intended recipient.

While preferred embodiments have been described herein, it will be understood by those with ordinary skill in the art that various modifications, changes, or alterations may be made to the invention disclosed and described herein without departing from its scope or its equivalent as claimed in the appended claims.

Other modifications too numerous to mention will easily occur to one of ordinary skill in the art.

What is claimed is:

1. A system for sending, in at least one first location, over telephone lines first audio/video data recorded in said at least one first location, receiving, in said at least one first location, over said telephone lines a reproduction of second audio/video data recorded in at least one second location, sending, in said at least one second location, over said telephone lines said second audio/video data recorded in said at least one first location, and receiving, in said at least one second location, over said telephone lines a reproduction of said first audio/video data recorded in said at least one first location, said system comprising:

a. a means for converting said first audio/video data in said at least one first location into a first stream of packets to be sent over said telephone lines;

b. a means for converting a second stream of packets in said at least one first location into said reproduction of said second audio/video data to be presented in said at least one first location;

c. a means for converting said second audio/video data in said at least one second location into said second stream of packets to be sent over said telephone lines;

d. a means for converting said first stream of packets in said at least one second location into said reproduction of said first audio/video data to be presented in said at least one second location; and e. a total of at least two means for bypassing a telephone company voice switch in at least two telephone company central offices, thereby allowing said first stream of packets and said second stream of packets to pass directly between at least one first local telephone line and at least one second local telephone line, respectively, and at least one long distance network;

said system being capable of sending said first audio/video data and said second audio/video data and receiving said reproduction of said first audio/video data and said reproduction of said second audio/video data in a full duplex, full motion, and live manner.

2. A system as claimed in claim 1, wherein said means for converting said first audio/video data comprises:

a. an audio/video encoder/decoder producing an audio/video encoder output data stream;

b. a packetizer accepting a processed form of said audio/video encoder output data stream after processing of said audio/video encoder output data stream between said audio/video encoder/decoder and said packetizer, said packetizer producing a stream of unbuffered packets; and c. a Digital Subscriber Lines (DSL) modem accepting said first stream of packets and sending said first stream of packets over said at least one first local telephone line, said first stream of packets being produced by buffering of said stream of unbuffered packets.

3. A system as claimed in claim 2, wherein said audio/video encoder/decoder comprises:

a. a block processor which accepts video data included in said first audio/video data and divides said video data into a plurality of blocks comprising an image;

b. a memory for storing a plurality of said images;

c. a motion sensor for determining an amount of motion between said image and an immediately following image;

d. a motion compensator to decide which block, if any, has changed and to what degree between said image and said immediately following image;

e. a data subtractor which determines an exact difference between said image and said immediately following image and stores said immediately following image into said memory if a change between said image and said immediately following image is sufficient under an encoding algorithm used;

f. at least one selector for selecting a difference between said image and said immediately following image stored in said memory;

g. a quantizer, an inverse quantizer, an orthogonal processor, and an inverse orthogonal process said difference between said image and said immediately following image; and h. an output coder which accepts input from said block processor and said inverse quantizer and outputs a video data stream.

4. A system as claimed in claim 3, wherein said means for converting said first audio/video data further comprises:

a. an analog to digital converter which accepts audio data included in said first audio/video data and converts said audio data from analog to digital form;

b. a memory which stores said audio data sent to said memory by said analog to digital converter;

c. a timing module which accepts a clock pulse from said video data stream and determines where to insert said audio data in said video data stream to synchronize audio to video; and d. an audio multiplexer which accepts said video data stream and accepts said audio data from said memory and combines said audio data and said video data stream in accordance with said determination of said timing module to produce an audio/video encoder output data stream.

5. A system as claimed in claim 4, wherein said means for converting said first audio/video data further comprises:

a. a data counter accepting said audio/video encoder output data stream and outputting flags corresponding to missing or corrupt bits in said audio/video encoder output data stream;

b. a frame memory which accepts said audio/video encoder output data stream from said data counter and outputs said processed audio/video encoder output data stream to said packetizer;

c. a frame memory processor which accepts said flags and notifies said frame memory of said missing or corrupt bits;

d. an image corrector which accepts bit location information of said missing or corrupt bits from said frame memory processor, determines appropriate correction for said missing or corrupt bits, and sends corrected bits to said frame memory; and e. a network interface converter accepting said stream of unbuffered packets from said packetizer, buffering said stream of unbuffered packets to conform with connection specifications of said DSL modem, thereby producing said first stream of packets, and sending said first stream of packets to said DSL modem.

6. A system as claimed in claim 2, wherein each of said at least two means for bypassing said telephone company voice switch comprises:

a. a line condition detector detecting an off-hook condition on one of said at least one first local telephone line and said at least one second local telephone line generated by a source selected from the group consisting of: a telephone, a splitter connected to said DSL modem, and a splitter connected to a DSL modem in said at least one second location;

b. a data detection circuit which receives a signal from said source through said one of said at least one first local telephone line and said at least one second local telephone line and through said line condition detector, determines whether said first stream of packets or said second stream of packets is present in said signal, and sends said signal directly to said at least one long distance network if said first or said second stream of packets is present, thereby bypassing said telephone company voice switch;

c. a voice loading coil which receives said signal from said data detection circuit if said first and said second stream of packets is not present in said signal, said voice loading coil transmitting said signal to said telephone company voice switch; and d. a directional combiner receiving from said at least one long distance network a transmission selected from the group consisting of: a voice call, said first stream of packets, and said second stream of packets, and sending said transmission to an intended recipient.

7. A system as claimed in claim 1, wherein said means for converting said second stream of packets comprises:

a. a Digital Subscriber Lines (DSL) modem receiving said second stream of packets from said at least one first local telephone line; and b. an audio/video encoder/decoder receiving an audio/video decoder input data stream from said DSL modem after processing of said second stream of packets between said DSL modem and said audio/video encoder/decoder.

8. A system as claimed in claim 5, wherein said audio/video encoder/decoder comprises:

a. an input decoder receiving said audio/video decoder input data stream and converting a portion of said audio/video decoder input data stream into blocks forming a video frame;

b. a block processor which evaluates those of said blocks which are changed from a video frame immediately before said video frame;

c. a memory which stores blocks forming a video frame and outputs said blocks as a complete video frame in a video output data stream; and d. a block inserter controlled by said block processor, said block inserter replacing said changed blocks in said memory.

9. A system as claimed in claim 8, wherein said audio/video encoder/decoder further comprises:

a. an audio demultiplexer which receives said audio/video decoder input data stream and outputs audio data included in said audio/video decoder input data stream;
   b. a memory receiving said audio data;
   c. a timing module which uses a clock pulse taken from said video output data stream to cause said memory to output said audio data in proper time relation with said video output data stream; and
   d. a digital to analog converter to convert said audio data output from said memory from digital form back into an analog audio signal.

10. A system as claimed in claim 7, wherein said means for converting said second stream of packets further comprises:

a. a network interface converter which receives said second stream of packets from said DSL modem and removes buffering placed on said second stream of packets by a second network interface converter in said at least one second location;
   b. a data counter which receives said second unbuffered stream of packets from said network interface converter and generates flags based on said second unbuffered stream of packets;
   c. a frame memory processor which receives said flags from said data counter; and
   d. a frame memory which receives said second unbuffered stream of packets from said data counter, which receives communications from said frame memory processor regarding which bits of said second unbuffered stream of packets to discard to allow creation of said reproduction of said second audio/video data, which discards said bits from said second unbuffered stream of packets, and which outputs said audio/video decoder input data stream to said audio/video encoder/decoder.

11. A system as claimed in claim 1, wherein each of said packets are of constant length.

12. A system as claimed in claim 1, wherein each of said packets comprise:

a. a start flag; and
   b. an end flag.

13. A system as claimed in claim 12, wherein each of said packets further comprise data specifying an encoding algorithm by which said audio/video data was encoded prior to being converted into said stream of packets.

14. A system as claimed in claim 13, wherein each of said packets further comprise data specifying the length of each of said packets.

15. A system as claimed in claim 1, each said packet of said first stream of packets and of said second stream of packets comprising:

a. a start flag;
   b. data specifying an encoding algorithm by which said encoded audio/video data was encoded;
   c. said encoded audio/video data; and
   d. an end flag.

16. A system as claimed in claim 15, each said packet further comprising data specifying the length of said packet.

* * * * *

UNITED STATES PATENT AND TRADEMARK OFFICE
CERTIFICATE OF CORRECTION

PATENT NO.   : 6,181,693 B1
DATED        : January 30, 2001
INVENTOR(S)  : Maresca It is certified that error appears in the above-identified patent and that said Letters Patent is hereby corrected as shown below:

<u>Column 9,</u>
Line 33, after "an inverse orthogonal" insert -- processor to --.

Signed and Sealed this

Thirty-first Day of January, 2006

JON W. DUDAS
*Director of the United States Patent and Trademark Office*